United States Patent [19]

Nishikawa et al.

[11] 4,185,296
[45] Jan. 22, 1980

[54] COLOR TELEVISION CAMERA

[75] Inventors: Shoji Nishikawa, Takaishi; Ryuhei Nakabe, Hirakata, both of Japan

[73] Assignee: Matsushita Electric Industrial Co., Ltd., Osaka, Japan

[21] Appl. No.: 826,242

[22] Filed: Aug. 19, 1977

[30] Foreign Application Priority Data

| Aug. 24, 1976 | [JP] | Japan | 51/101330 |
| Aug. 24, 1976 | [JP] | Japan | 51/101331 |
| Nov. 20, 1976 | [JP] | Japan | 51/139789 |
| Dec. 22, 1976 | [JP] | Japan | 51/155435 |

[51] Int. Cl.² .................................... H04N 9/07
[52] U.S. Cl. ............................................ 358/45
[58] Field of Search ............................ 358/45, 46

[56] References Cited

U.S. PATENT DOCUMENTS

| 3,755,620 | 8/1973 | McMann | 358/45 |
| 3,939,486 | 2/1976 | Tomii | 358/46 |

FOREIGN PATENT DOCUMENTS 52-17970  5/1977 Japan ............................................ 358/45

Primary Examiner—John C. Martin
Attorney, Agent, or Firm—Spencer & Kaye

[57] ABSTRACT

A color television camera of the phase-split type is disclosed wherein an index signal derived by horizontally scanning an index-generating section, produced at the beginning or end portion of vertical scan for an image pickup tube, is converted to a low-frequency signal by a frequency converter so that a low-frequency index signal in at least one horizontal scan period is written into a memory circuit, and the low-frequency index signal is read out for each horizontal scan to produce a standard color television signal from two color-difference signals. The two color-difference signals are derived by processing a modulated color signal, which has been space-modulated by a stripe filter disposed in front of the image pickup tube, and a low-frequency signal or a brightness signal derived from the image pickup tube.

29 Claims, 18 Drawing Figures

COLOR TELEVISION CAMERA

The present invention relates to a phase-split type color television camera.

Known phase-split type color television cameras include those with an optical index system in which an index is optically generated to separate color images which have been space-modulated with different phase information, and those with an electronic index system in which the index is generated electrically.

In one known example of the optical index system, red, blue and green stripe color filters are arranged sequentially in front of an image pickup tube in a direction perpendicular to the horizontal scan direction. An oblique black and white stripe filter or neutral density stripe filter, having different light transmission factors, and having the same period as the stripe color filters and with its phase changed by 180 degrees for each horizontal scan, is overlaid on the color filters. By means of these arrangement, an optically modulated light signal is converted to an electrical signal by the beam scan, and only that component of the electrical signal which has been modulated by the stripe color filters is separated. The modulated color signal and the index signal are separated by the sum and difference of the separated signal component and a one-horizontal cycle delayed version thereof to produce a color difference signal by synchronously detecting a color carrier component with the index signal. One of the greatest drawbacks of this system is that the relative phase relation between the modulated color signal and the index signal changes depending on the particular position of the beam scan and therefore the position of the beam scan must be completely fixed.

In one example of the electronic index system, red, blue and green stripe color filters are arranged sequentially perpendicular to the horizontal scan direction, and a transparent electrode is overlayed on the stripe color filters, which transparent electrode is the same as the two period length of the color filters in width and divided into two comb-shaped segments.

An alternating potential of a cycle equal to one half of the horizontal cycle is applied across the two electrodes to change the back-side potential of a photoconductor film to induce the index signal which is read out simultaneously with a modulated color signal, the latter having been space-modulated by the stripe color filters, to produce a combined signal of the modulated color signal and the index signal, the phase of which changes by 180 degrees for each horizontal scan. The modulated color signal is separated from the index signal by one horizontal period correlation. The modulated color signal is synchronously detected by the index signal to produce a color difference signal. Although this system has been put into practice, it requires precision work to divide the transparent electrode into two comb-shaped segments having the spacings of several microns and hence this system is expensive considering the yield and other factors.

Further, it is proposed that the color television camera be constructed so that an index component, having the same period as that of the stripe color filters, is produced at the beginning or end of the vertical scan of the image pickup tube which includes the stripe color filters. The index component thus produced is stored, and then sequentially read out to use as the index signal. However, since an index frequency of about 3.5 to 4.5 MHz is generally required, and therefore complex and expensive memory elements and a peripheral circuit, it is difficult to put this system into practice.

One object of the present invention is to produce a color television camera of either the single tube or dual tube type, which is capable of providing, in a simple and stable manner, an index signal for separating a color signal without affecting the picture image.

Accordingly, in the present invention, the color television camera comprises a frequency converter for converting an index signal synchronized with a modulated color signal which has been space modulated by a stripe color filter provided on an image pickup tube into a low frequency signal, a memory circuit for storing and reading out the low frequency signal and a color signal generator for producing a color difference signal from the signal read out of the memory circuit and the modulated color signal.

According to one embodiment of the present invention, the index signal is derived from an index section provided at a beginning or end portion of the vertical scan of the image pickup tube. Accordingly, the color monitor television picture image is not influenced by the index signal at all and the S/N ratio of the index signal can be improved. Furthermore, since precision working of the transparent electrode of the image pickup tube to provide the index signal is not required, the yield of the image pickup tube is high and therefore an inexpensive color television camera can be produced.

In addition, since the index signal is converted into a low-frequency signal, the capacity of the memory circuit can be reduced.

The above and other objects, features and advantages of the present invention will be apparent from the following description of the preferred embodiment of the invention when taken in conjunction with the accompanying drawings, in which:

FIG. 1b shows a side elevational view of FIG. 1a;

FIG. 9b shows a side elevational view of FIG. 9a;

FIG. 12b illustrates a way to derive a start/stop pulse from the start index section of FIG. 12a.

Figure 1A:
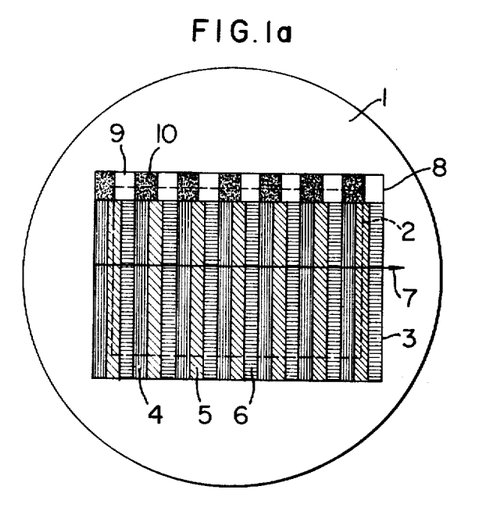
FIG. 1a shows an arrangement of an index section, a stripe color filter and an image pickup tube in accordance with one embodiment of the present invention.
Figure 1B:
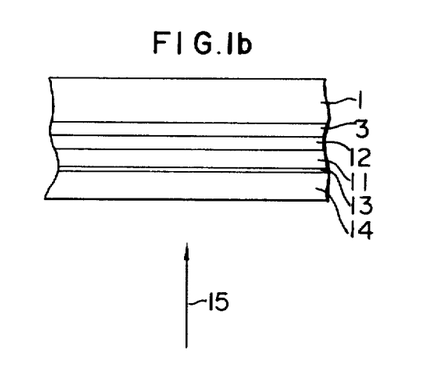

FIGS. 1a and 1b show the relation between the arrangement of stripe color filters, an index section and an image pickup tube of a color television camera comprising the present invention, and the beam scan.

In FIGS. 1a and 1b, numeral 1 denotes the faceplate glass of the image pickup tube. Numeral 2 denotes a scan plane, and numeral 3 denotes a stripe color filter having, for example, red areas 4, green areas 5 and blue areas 6 arranged sequentially in this order. Numeral 7 denotes the direction of horizontal scan of the beam. Numeral 8 denotes an index section to provide an index signal which, for example, includes alternate transparent areas 9 and black areas 10. The repetition width of the red areas 4 the green areas 5 and the blue areas 6 of the stripe color filter 3 is equal to the repetition width of the transparent areas 9 and the black areas 10 of the index section 8. FIG. 1b shows a side elevational view of FIG. 1a, in which numerals 1 and 3 are identical to the corresponding parts in FIG. 1a, and numeral 11 denotes a thin glass plate. Numeral 12 denotes a bonding agent for bonding the thin glass plate 11 and the stripe color filter 3 together, numeral 13 denotes a transparent electrode, numeral 14 denotes a photoconductor layer, and numeral 15 denotes the direction of electron beam bombardment.

Figure 2:
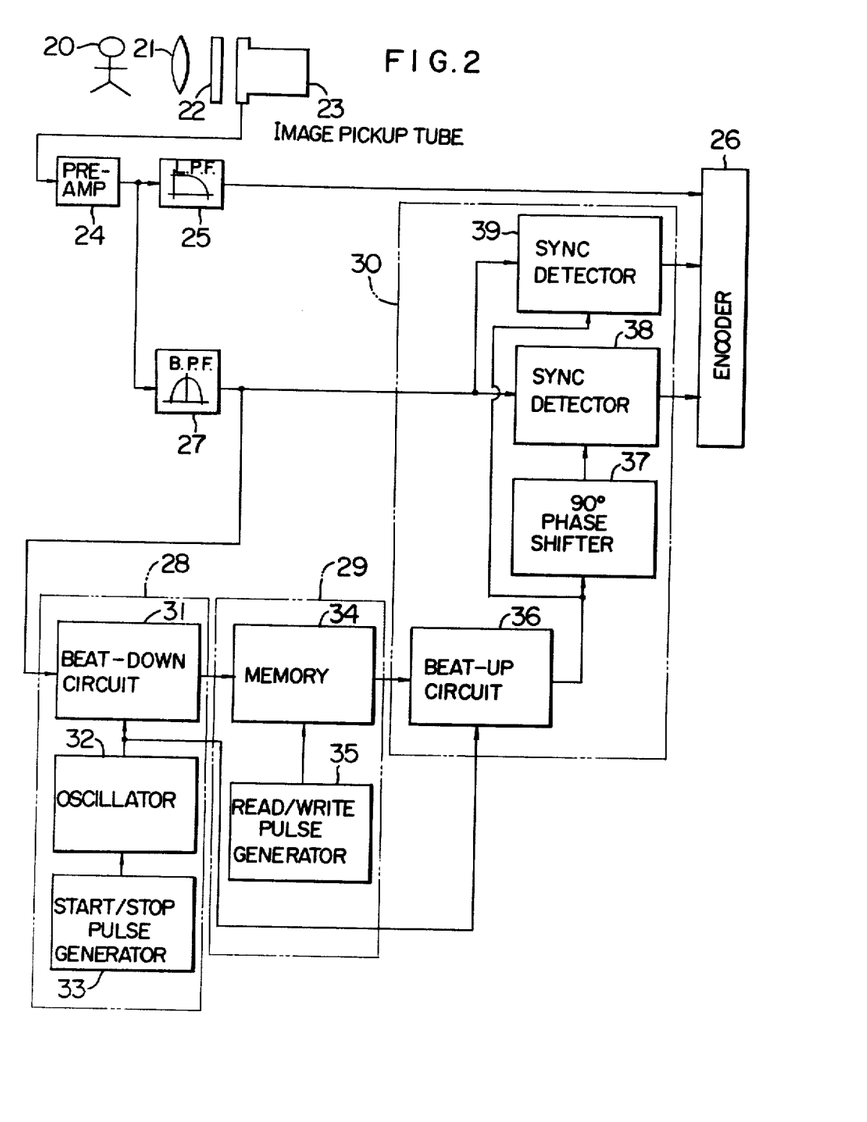
FIG. 2 shows a configuration of one embodiment of the present invention.

FIG. 2 shows a basic configuration of one embodiment of the color television camera according to the present invention. In FIG. 2, numeral 20 denotes an object, 21 denotes a lens, 22 the stripe color filter described above, 23 the image pickup tube described above, 24 a pre-amplifier, 25 a low-pass filter, 26 an encoder, 27 a band-pass filter, 28 a frequency converter section, 29 a memory section, and 30 a color signal generator section. The frequency converter section 28, comprises a beat-down circuit 31, an oscillator 32 and a start/stop pulse generator 33 for starting and stopping the oscillation of the oscillator 32. The memory section 29 comprises a memory device 34 and a read/write control pulse generator 35. The color signal generator section 30 comprises a beat-up circuit 36, a 90° phase shifter 27, and synchronous detectors 38 and 39.

Figure 3:
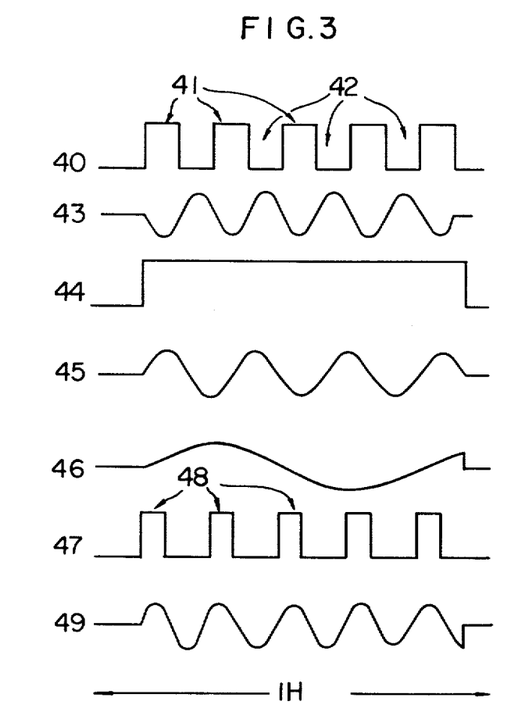
FIG. 3 shows waveforms at various points in FIG. 2.

The operation of the configuration of FIG. 2 will now be described in conjunction with the waveforms shown in FIG. 3. The backside potential of the index section 8 is shown by a waveform 40 in which numerals 41 and 42 denote backside potentials at the transparent areas 9 and the black areas 10, respectively. The signal waveform 40 is derived from the image pickup tube 23 by beam scanning the index section 8 and this signal is fed through the pre-amplifier 24 and the band-pass filter 27 to provide only a fundamental wave component which is an index signal shown by a waveform 43. A pulse from the start/stop pulse generator 33 is turned on at the beginning of a horizontal scan synchronizing signal HD and turned off at the end thereof, as shown by the waveform 44. This pulse 44 controls the oscillator 32 to produce an output waveform 45. In the beat-down circuit 31, the output 43 of the band-pass filter 27 is frequency converted into a low-frequency signal 46 by the output 45 of the oscillator 32. The low-frequency signal 46 is then written into the memory device 34. The read/write control for the memory device 34 is operated by the output of the read/write control circuit 35. The write in to the memory device 34 is effected only when the index section 8 is being scanned by the beam. At least one horizontal period of required for the write operation. Each time the stripe color filter 3 is scanned by the beam, the signal stored in the memory device 34 is read out in synchronism with the horizontal scan. It is necessary that the memory device 34 be capable of storing the information for at least one vertical period. The signal thus read out is a low-frequency index signal, the waveform of which is the same as the waveform 46. In the beat-up circuit 36 the low-frequency index signal is beat against the output 45 of the oscillator 32 to reproduce an index signal which is identical to the output 43 of the band-pass filter 27.

Now, for the purpose of simplification, let us assume that the object is red. In this case, the backside potential of the stripe color filter 3 is shown by a waveform 47 in which numeral 48 denotes the backside potential corresponding to the red areas 4. By beam scanning the stripe color filter 3, the backside potential waveform 47 is read out of the image pickup tube and fed through the pre-amplifier 24 and the band-pass filter 27 to provide only the fundamental component shown by a waveform 49, which is a modulated color signal. In the synchronous detector circuits 38 and 39, by detecting the modulated color signal synchronously with the reproduction index signal derived from the beat-up circuit 36 and a phase-shifted version of the index signal derived from the 90° phase-shifter 37 respectively, two color-difference signals can be obtained. A brightness signal is derived by feeding the signal obtained from the image pickup tube 23 through the pre-amplifier 24 and the low-pass filter 25. The low-pass filter 25 serves to eliminate the modulated color signal. The brightness signal and the two color-difference signals are applied to the encoder 26 to provide a standard color television signal.

The two color-difference signals are now explained in detail.

Figure 4A:
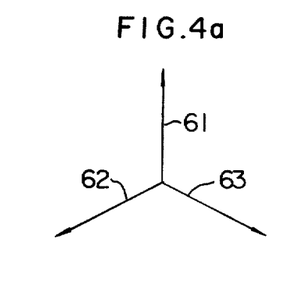
FIG. 4a shows a phase relationship of a modulated color signal.
Figure 4B:
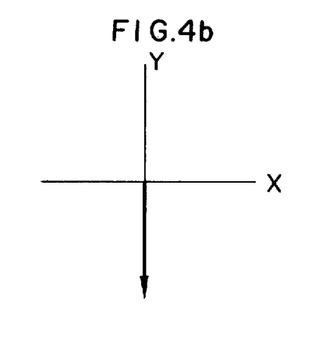
FIG. 4b shows the phase relationship of an index signal.

FIGS. 4a and 4b show the phase relationships of the modulated color signal and the index signal. FIG. 4a shows the phase relationship of the modulated color signal and numerals 61, 62 and 63 denote the phases for red, green and blue, respectively. If the red, green and blue stripe color filters are arranged equidistantly, the red, green and blue axis of phases 61, 62 and 63 have a phase relationship such that the axes of the color signals differ in phase by 120° from each other. FIG. 4b shows the phase relationship of the index signal. If the modulated color signal is synchronously detected on the Y-axis of the index signal, that is, in phase with the index signal, a signal $-(R-B+G/2)$ is produced, and if it is synchronously detected on the X-axis, that is, by an index signal which is phase-shifted by 90 degrees with respect to the Y-axis a signal $\sqrt{3}/2(B-G)$ is produced. The output of the synchronous detection on the Y-axis and X-axis correspond to the color-difference signal at the outputs of the synchronous detection circuits 38 and 39.

While in the above description a stripe color filter having red, green and blue areas is used, if the object is of white color it is necessary to make the output signals uniform and a complementary color filter may be used in order to equalize the output signals levels and improve the S/N ratio of the brightness signal. Further, the spacing of the stripe color filter may be changed in order to provide a color television signal closer to the standard one.

Figure 5:
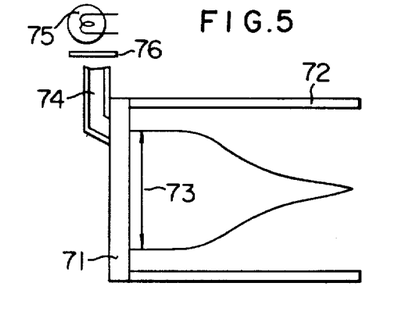
FIG. 5 shows a configuration of the index section.

The index section will now be explained in detail. In FIG. 5, numeral 71 denotes a light receiving section of the image pickup tube including the faceplate glass, the stripe color filter, the transparent electrode and the photoconductor layer, numeral 72 denotes a glass tube and numeral 73 denotes the vertical scan width of the beam current. The application of biasing light may be made in the following way. At an end of the scan width there is provided a light transmitting material 74 such as glass or plastic having a definite thickness and a tapered edge. The light transmitting material is masked except for an area throughwhich light is to be transmitted, and a biasing lamp 75 is turned on to apply biasing light through a color filter 76 having a color corresponding to one of the colors of the stripe color filter to a specified area. The application of biasing light may also be made not by application of the biasing light of a specified color, but, e.g., by providing a mask part 81 having a period length which is the same as the stripe color filter (as shown in FIG. 6) and applying white light to this part.

Figure 6:
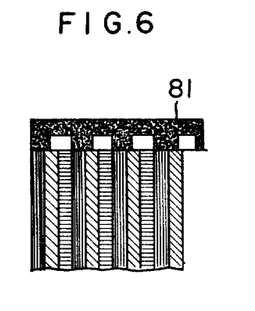
FIG. 6 shows an arrangement of the index section and the stripe color filter.

Alternatively, the areas other than the index section may be masked by an infrared cut filter to block the infrared ray so that only the index section shown in FIG. 6 will be illuminated by the infrared ray. Instead of using the biasing light, as in the above examples, the following method may be used. The index configuration may be made by using a masking part similar to the masking part 81 previously described and illuminating the index section beforehand with a high intensity light to produce permanent printing on the photoconductor layer; that is, to make the illuminated portion inactive so that the index signal may be produced with only the electron beam scan without using the biasing light. As a further alternative, the transparent electrode or the photoconductor layer at the masking part 81 may be removed.

It is not always necessary for the period or repetition interval of the index section to be equal to the period or repetition interval of the stripe color filter but it is sufficient if repetition intervals of a constant ratio are used. In this case, the interval of the index section may be converted by a circuit to an interval equal to that of the stripe color filter for further processing. Alternatively the index signal may be frequency-converted without changing the interval, stored in and read out of the memory, and synchronously detected while changing the interval to be equal to the interval of the modulated color signal.

Further, the position of the index section need not be at the beginning of the vertical scan but it may be at the end of the vertical scan period. In the latter case, the index section can be scanned in a similar manner to produce the index signal.

The memory device will now be explained. The memory device may be either an analog memory or a digital memory. In the latter case, however, an A/D converter and a D/A converter are required. A clock frequency is determined depending on the frequency of the signal to be stored. For example, when the frequency of the oscillator $f_o$ is 4.0 MHz and the frequency of the index signal $f_i$ is 4.5 MHz, the output frequency of the beatdown circuit is equal to $f_i - f_o = 500$ KHz and therefore in accordance with sampling theory, a sampling frequency which is at least twice as high as the sampled frequency is required. Generally, a frequency of 2.5 to 3 times as high as the sampled frequency will be sufficient. When it is three times as high the frequency becomes 1.5 MHz. When an analog memory is used, with the clock pulse frequency for driving the memory being 1.5 MHz an analog memory capacity of about 80 words will be sufficient. Such an analog memory may be manufactured without any particular difficulties from the aspect of frequency and number of elements.

When a digital memory is used, the requirement for the clock frequency is the same but it is necessary to carry out encoding by an A/D converter. The encoded signal is written into the digital memory and then read out and decoded by a D/A converter to reproduce the original analog signal.

When the signal is encoded by the A/D converter, if the sampling frequency is 1.5 MHz, more than five bits are required as the number of bits for encoding by the A/D converter in order to ensure that an error in the reproduced analog signal is within an allowable range. When the coding is made with 5 bits the number of bits of the digital memory is equal to $5 \times 80 = 400$. Thus, a relatively small capacity memory can be used.

The clock pulse for driving the memory device may be the output without modification thereof of the oscillator or the signal obtained by counting-up or counting-down the output signal.

Figure 7:
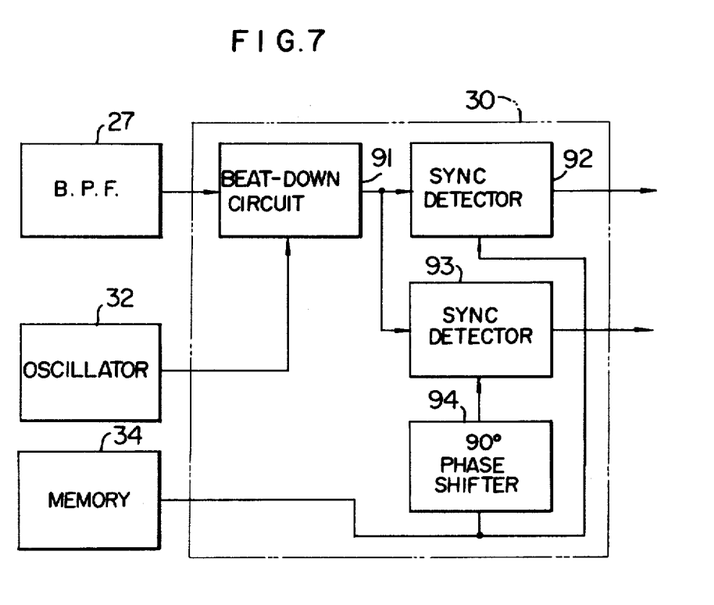
FIG. 7 shows one embodiment of a color signal generating circuit used in the present invention.

The two color-difference signals may be obtained by using the color modulated signal and the low-frequency index signal or by using the color signal generator shown in FIG. 7. The color signal generator 30 shown in FIG. 7 comprises a beat-down circuit 91, synchronous detectors 92 and 93 and a 90° phase shifter 94. The band-pass filter 27, the oscillator 32 and the memory device 34 are identical to those shown in FIG. 2, and the signals are also identical. In the beat-down circuit 91, the modulated color signal is beat against by the output of the oscillator 32 to produce a low-frequency modulated color signal having the same frequency as the low-frequency index signal. In the synchronous detectors 92 and 93 the low-frequency modulated color signal is synchronously detected by using the low-frequency index signal read out of the memory device 34, and the signal obtained by phase shifting the index signal by means of the 90° phase shifter 94 to provide the two color difference signals.

Figure 8A:
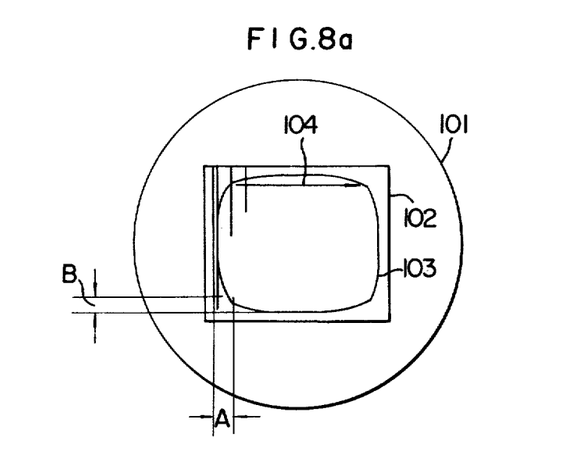
FIG. 8a shows the index section and the stripe color filter.
Figure 8B:
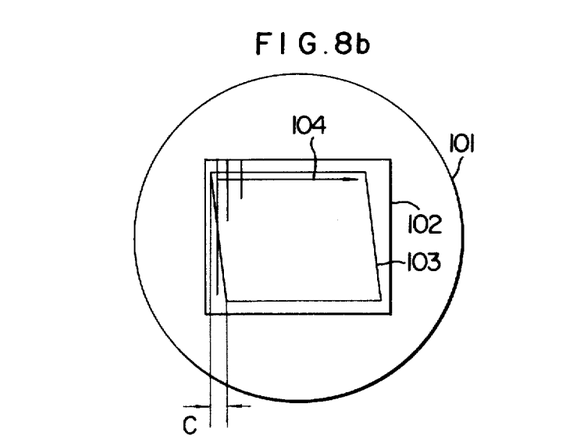
FIG. 8b shows beam scan distortion.

While the embodiment described above shows an ideal case, it is difficult in practice to have the stripe color filter and the beam scan parallel in both the horizontal and vertical directions. That is, there is an error in the orthogonal relation of the deflection yoke or a shift at the perimetric portions or a beam scan distortion due to a definite deflection angle. Referring to FIGS. 8a and 8b, numeral 101 denotes the faceplate glass of the image pickup tube, 102 the stripe color filter, 103 the beam scan plane, and 104 the index section. FIG. 8a shows the beam scan distortion in the beam scan plane, in which a barrel distortion is shown illustrating that distortion occurs at an end A in the horizontal direction and at an end B in the vertical direction. FIG. 8b shows an example where the stripe color filter is not completely registered with the beam scan section and a distortion occurs at C.

A system which is free from a phase error of the index signal due to beam scan distortion is explained below.

Figure 9A:
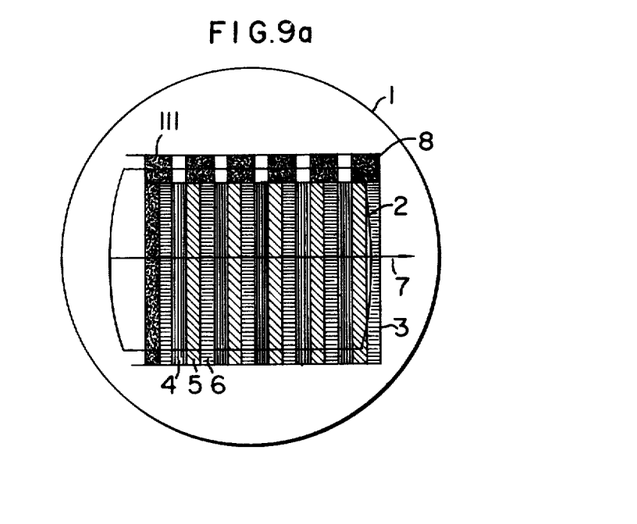
FIG. 9a shows an arrangement of a start index section, the index section and the stripe color filter in accordance with one embodiment of the present invention.
Figure 9B:
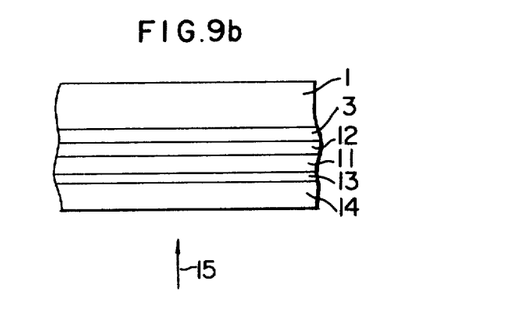

FIGS. 9a and 9b show an arrangement of the stripe color filter, the index section, the start index section and the image pickup tube and its relationship to the beam scan. For the purpose of simplification, it is assumed that the transparent areas of the index section are in phase with the red areas of the stripe color filter. Numerals 1 and 8 denote the same parts as those of FIG. 1a but the scan plate 2 includes the beam scan distortion. Numeral 111 denotes the start index section. FIG. 9b shows a side elevational view of FIG. 9a and corresponds to FIG. 1b.

The start index section and the index section may be constructed in accordance with the biasing light technique or by selectively removing the transparent electrode or the photoconductor layer of the image pickup tube, as explained above in connection with the previous embodiment. The stripe color filter may be constructed in the same manner as in the previous embodiment.

Figure 10:
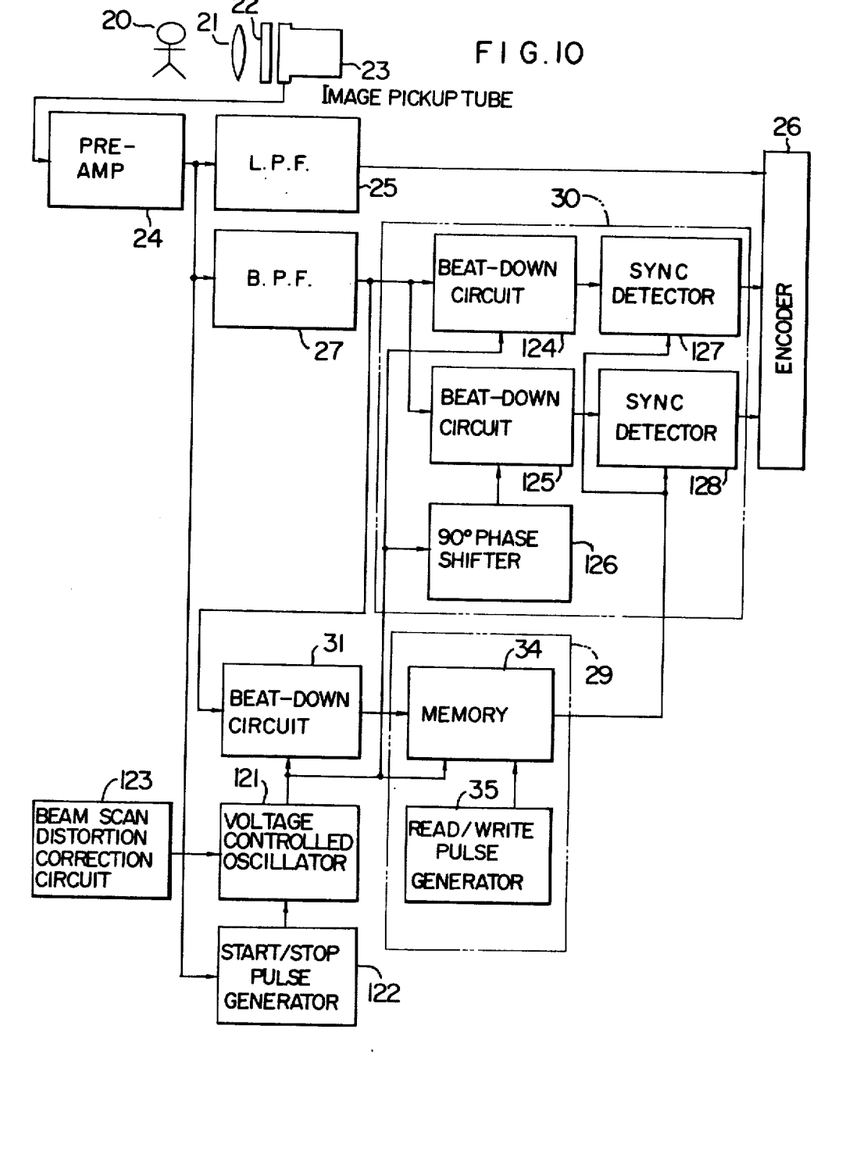
FIG. 10 shows the basic configuration of one embodiment of the present invention.

FIG. 10 shows the basic configuration of the present invention, in which numerals 20 to 27, 29 to 31, 34 and 35 denote the same parts as those of FIG. 1. Numeral 121 denotes a voltage controlled oscillator VCO, 122 a start/stop pulse generator, 123 a beam scan distortion correction circuit, 124 and 125 beat-down circuits, 126 a 90° phase shifter, and 127 and 128 synchronous detectors.

Figure 11:
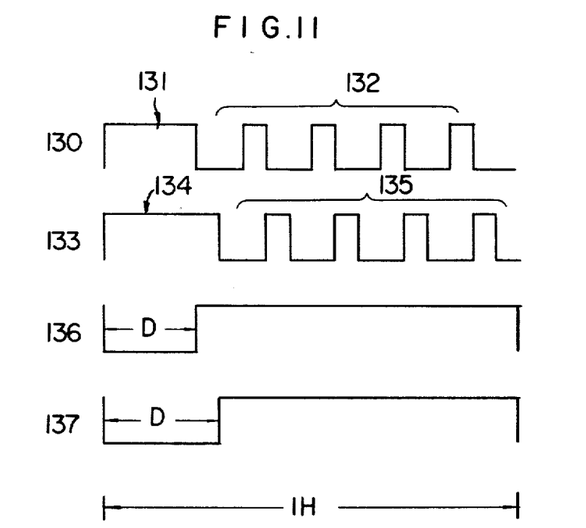
FIG. 11 shows signal waveforms produced by the start index section of the present invention.

FIG. 11, shows waveforms produced at the output of the pre-amplifier by the beam scan. In FIG. 11, 130 denotes the waveform produced during one horizontal period by the beam scan of the index section, 131 the waveform derived from the start index section 111, and 132 a signal waveform derived from the index section. A waveform portion 134 of a waveform 133 represents a signal derived from the start index section 111, and another waveform portion 135 represents a signal derived from the stripe color filter. Start/stop pulses 136 and 137, measuring the fall of the signal derived from the start index section (i.e., the first trailing edge derived from the horizontal scan is detected and the detected edge is made a start point, and a leading edge of the horizontal scan synchronizing signal is detected and the detected edge is made a stop point) are generated by the start/stop pulse generator 112. The waveform 136 is derived from the waveform 130 and the waveform 137 is derived from the waveform 133, and the pulse width D of waveform 136+137 is determined depending on the beam scan distortion.

For the purpose of simplification, it is assumed in the following explanation that the beam scan distortion exists for the horizontal scan only and that there is no beam scan distortion for the vertical scan.

When the angular frequency by the n-th horizontal scan is $\omega_c(n)$, the pulse width of the start/stop pulse is $D(n)$, and the object's color is red, then the carrier wave at the output of the band-pass filter 27 is expressed as follows $$E(n) \sin [\omega_c(n)\{t-D(n)\}] \quad (1)$$

$$\therefore t - D(n) > 0$$

where n = 1 represents the signal derived from the index section and E (n) represents an amplitude and t=0 represents the beginning of the horizontal synchronizing signal.

The oscillation of the VCO 121 is turned on and off by the start/stop pulse and the frequency of the VCO 121 is controlled by the output of the beam scan correction circuit 123. When the angular oscillation frequency of the VCO 121 at the scan of the index section is $\omega_o$, and the angular frequency of the VCO 121, at the n-th horizontal scan, is changed to $M(n) \omega_o$ (where $M(n)$ represents a magnification factor at the n-th horizontal scan (M (1) = 1)) by the output voltage of the beam scan distortion correction circuit, the output of the VCO 121 at the n-th horizontal scan is expressed as follows:

$$\sin [M(n) \omega_o\{t-D(n)\}] \quad (2)$$

$$\therefore t - D(n) > 0$$

where t=0 represents the beginning of the horizontal synchronizing signal.

At n=1, that is, at the scan of the index section, the output of the beat-down circuit 31 is derived by multiplying the formula 1 by the formula 2 and taking out the low-frequency component of the product. This is expressed as follows:

$$\cos [\{\omega_c(1)-\omega_o\}\{t-D(1)\}] \quad (3)$$

The amplitude term is omitted in the formula 3 above. The signal represented by the formula 3 is written into the memory device 34. The read out of the stored signal is now explained. Since the clock pulse for driving the memory device 34 is the signal derived from the VCO, that is, the signal expressed by the formula 2, the signal read out lags behind the write in signal by the amount of $D(1)-D(n)$ and the angular frequency of the signal read out becomes $M(n)$ times as high as the write in signal. It is expressed as follows, $$\cos [M(n) \{\omega_c(1)-\omega_o\}\{t-D(n)\}] \quad (4)$$

This is the low-frequency index signal and the signal is fed to the color signal generator 30.

The modulated color signal derived from the band-pass filter 27 as expressed by the formula 1 is beat down in the beat-down circuits 124 and 125 of the color signal generator 30 by the output of the VCO 121 as expressed by the formula 2, and a phase shifted version thereof derived from the 90° phase shifter 126.

The output of the beat-down circuit 124 is derived by multiplying the formula 1 by the formula 2 and taking out the low-frequency component from the product. It is then expressed as follows:

$$E(n)/2 \cos [\{\omega_c(n)-M(n)\omega_o\}\{t-D(n)\}] \quad (5)$$

and the output of the beat-down circuit 125 is derived by multiplying the formula 1 with the 90° phase shifted version of the formula 2 and taking out the low-frequency component from the product. It is then expressed as follows:

$$E(n)/2 \sin [\{\omega_c(n)-M(n)\omega_o\}\{t-D(n)\}] \quad (6)$$

The outputs of the beat-down circuits 124 and 125, that is, the signals represented by the formulas 5 and 6 are synchronously detected in the synchronous detectors 127 and 128 by the low-frequency index signal, that is, the signal expressed by the formula 4. The output of the synchronous detector 127 is derived by multiplying the formula 5 by the formula 4 and taking out the low-frequency component from the product. It is then expressed as follows:

$$E(n)/2 \cos [\{M(n) \omega_c(1)-\omega_c(n)\}\{t-D(n)\}] \quad (7)$$

Similarly, the output of the synchronous detector 128 is expressed as follows:

$$E(n)/2 \sin[\{M(n)\omega_c(1)-\omega_c(n)\}\{t-D(n)\}] \quad (8)$$

Now, when the output of the beam scan distortion correction circuit is adjusted so that the angular frequency of the output of the VCO becomes:

$$M(n)\omega_c(1)=\omega_c(n) \quad (9)$$

then the formulas 7 and 8 become equal to E (n)/2 and 0, respectively. Thus, the color difference signals are E (n)/2 and 0 and hence the error in the index signal due to the figure distortion in the beam scan is removed.

The distortion in the horizontal scan has been explained above. Even when a distortion in the vertical scan is added, the phase error of the index signal due to beam scan distortion can be similarly eliminated by adjusting the magnification factor, M (n, t), of the angular frequency of the VCO by the beam scan distortion correction circuit such that the angular frequency becomes:

$$M(n, t)\omega_c(1, t)=107_c(n, t) \quad (10)$$

where M (n, t) represents the magnification factor at the time t in the n-th horizontal scan, and $\omega_c(1, t)$ represents the angular frequency of the index signal at the time t, and $\omega_c$ (n, t) represents the angular frequency of the modulation color signal at the time t of the n-th horizontal scan. The waveforms used for correcting the beam scan distortion are generally parabolic waveforms, for both horizontal and vertical distortions.

The start index section will now be explained in detail.

Figure 12A:
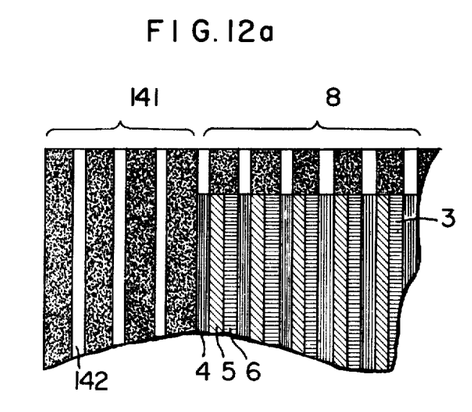
FIG. 12a shows an arrangement of the start index section, the index section and the stripe color filter in accordance with one embodiment of the present invention.
Figure 12B:
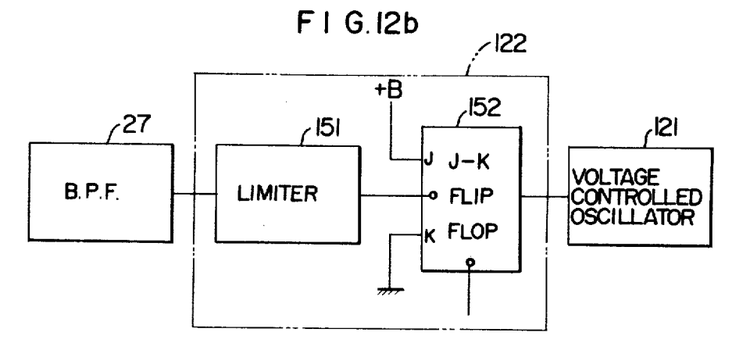
Figure 12C:
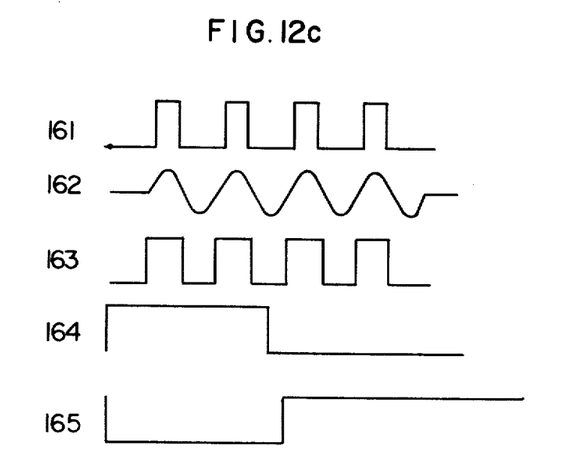
FIG. 12c shows waveforms at various points in FIG. 12b.

When the arrangement in FIG. 9a is used, the start/stop pulse is derived from the transparent areas and the black areas by the waveforms 130 and 133 shown in FIG. 11. In this arrangement, if the focus electrode voltage of the image pickup tube changes, the start time of the start/stop pulse is shifted since the falling portion of the waveform to be detected has an inclination or because the mean value of the signal derived from the image pickup tube changes, and thereby a phase error will be introduced in the color difference signals. A method which is free from the phase error will now be explained below. In FIG. 12a numeral 141 denotes a start index section, 8 the index section described above, 3 the stripe color filter described above, and 4, 5 and 6 the red, green and blue areas, respectively. For the purpose of simplification it is assumed that the transparent areas 142 of the start index section 141 are in phase with the red areas 4, and that the signal derived from the start index section and the modulated color signal have the same frequency. FIG. 12b shows a configuration of a start/stop pulse generator 122. Numerals 27 and 121 denote the same parts as those in FIG. 10. Numeral 151 denotes a limiter circuit, and 152 a J-K flip-flop having a J-terminal connected to a power supply, a K-terminal connected to ground, a clock terminal connected to the limiter circuit 151 and an output terminal connected to the VCO 121. FIG. 12c shows various waveforms, in which numeral 161 denotes a backside potential of the start index section. The signal 161 is read during the beam scan and is fed through the preamplifier 24 and the band-pass filter 27 to provide only a fundamental component signal shown by 162. The signal 162 is then fed through the limiter circuit 151 to provide a square wave signal 163. A pulse 164 rises at the beginning of the horizontal synchronizing signal and falls at a certain point of the square wave signal 163. The signal 164 is applied to the clear terminal of the J-K flip-flop and the signal 163 is applied to the clock terminal to produce a signal 165. The rise of the signal 165 is in phase with the rise of the signal 163, which occurs immediately after the fall of the signal 164. In this arrangement, the start point of the start/stop pulse is always in phase with the fall of the square wave. Thus, since the start point is detected from the same fundamental component as that of the modulated color signal, the phase relation between the start point and the modulated color signal is not affected by the divergence of the image pickup tube's focus voltage or the change in the mean value of the image pickup tube's output and the phase relationship of the start point and the modulated color signal is always maintained constant. Even if the detection of the fall of the signal 163 shifts by one cycle, that is, by 360 degrees in comparison with the case of the index scan, no phase error of the color difference signal will occur in the synchronous detection circuits 127 and 128. This is because the signals derived from the start index section, the index section and the stripe color filter are expressed by $\sin \omega_1 t$ if the angular frequency thereof are $\omega_1$ and the object is red, and the signal $\cos(\omega_1 t-\omega_2 t)$ is written into the memory device 34 if the output of the VCO at the scan of the index section is expressed by $\sin \omega_2 t$. During the scan of the stripe color filter, if the start point shifts one cycle as described above the signal $\cos\{(\omega_1-\omega_2)(t-2\pi/\omega_1)\}$ is read out of the memory device 34. At this time the output of the beat-down circuit 124 is $\cos\{\omega_1 t-\omega_2(t-2\pi/\omega_1)\}$, and the phase difference between the output of the beat-down circuit 124 and the output of the memory device 34 is thus equal to $2\pi$ and therefore no phase error is introduced in the synchronous detection. The same is true when the detection of the fall of the square wave shifts by two, three, or more cycles. In this detection of the start point the fall of the square wave is detected and this detected point is made a start point. The start point detection will be made in like manner when the rise of the square wave is detected.

In the above embodiment, the beam scan distortion near the index section 8 substantially coincides with the index section, and the distortion near the start index section 111 also substantially coincides with the start index section 111. Accordingly, the deflection distortion correction waveform may be established so that the color reproduction at the farthest portion from both the index sections will become the best possible, and the adjustment of the waveform can be made with ease.

The same result can be obtained also when the color signal generator shown in FIG. 2 is used instead of the color signal generator shown in FIG. 10.

The memory device shown in FIG. 10 is identical to that shown in FIG. 2, although the clock pulse for driving the memory device 34 can be the output of the VCO 32 without modifying it or a signal made by counting-up or counting-down the output.

It should be understood that the method described above can be applied to a display system such as an index tube.

What is claimed is:

1. A color television camera comprising:
    means for converting an index signal synchronized with a modulated color signal, said modulated color signal being space modulated by a stripe color filter, into a low frequency signal;

means for storing the converted low-frequency signal;

means for generating a signal for correcting beam scan distortion;

means for controlling a phase of said low frequency converted index signal in accordance with said correction signal; and means for processing in a circuit, the signal read out of said storing means and said modulated color signal to produce a color signal.

2. A color television camera as claimed in claim 1, wherein said means for producing the color signal includes a means for frequency converting the signal read out of said storing means into a signal having the same frequency as said modulated color signal; and means for synchronously detecting said modulated color signal by the signal read out of said frequency converting means.

3. A color television camera as claimed in claim 1, wherein said means for producing the color signal includes means for frequency converting said modulated color signal into a signal having the same frequency as said converted low-frequency signal, and means for synchronously detecting the signal derived from said frequency converting means by the signal read out of said storing means.

4. A color television camera including an image pickup tube having a photoelectric conversion element and a stripe color filter for transmitting light of different colors therethrough, said color television camera further comprising:

an index section formed on a portion of said photoelectric conversion element;

a frequency conversion means for frequency converting an index signal obtained by said photoelectric conversion element into a low-frequency index signal;

means for storing the signal derived from said frequency conversion means;

means for reading out the low-frequency index signal from said storing means during each horizontal scan;

means for generating a signal for correcting beam scan distortion;

means for controlling the phase of said low-frequency index signal in accordance with said correction signal; and means for processing a modulated color signal, which is space modulated by said stripe color filter and obtained at each horizontal scan, and said low-frequency index signal to provide a color signal.

5. A color television camera as claimed in claim 1, wherein the ratio of the repetition frequency of said index signal obtained by scanning said index section to a repetition frequency of said modulated color signal is constant.

6. A color television camera as claimed in claim 4 which further comprises means for applying a biasing light to said stripe color filter, said biasing light including at least one of the colors of the light to be transmitted through said stripe color filter.

7. A color television camera as claimed in claim 4, wherein said image pickup tube further includes means for applying a biasing light to said photo-electric conversion element and a masking means for repeated application and nonapplication of said biasing light at a predetermined interval.

8. A color television camera as claimed in claim 4, wherein said photoelectric conversion element comprises a photoconductor layer and a transparent electrode said photoconductor layer of said transparent electrode being selectively removed at a predetermined interval.

9. A color television camera as claimed in claim 4, wherein said photoelectric conversion element includes a photoconductor layer having printed portions thereon at predetermined fixed intervals.

10. A color television camera as claimed in claim 4, wherein said index section comprises means for applying an infrared ray to said photoelectric conversion element and means for masking said infrared ray at a predetermined interval.

11. A color television camera as claimed in claim 4, wherein said frequency conversion means includes oscillation means, and mixing means for mixing said index signal with the output signal of said oscillation means.

12. A color television camera as claimed in claim 11, wherein said oscillation means comprises an oscillator, the oscillation of which is started and stopped in response to a start/stop signal.

13. A color television camera as claimed in claim 11, wherein a clock pulse for reading out the low-frequency index signal from said storing means is derived from the output signal of said oscillation means or from a signal which is obtained by counting-up or counting-down of the output signal.

14. A color television camera as claimed in claim 4, wherein said means for processing said color signal includes means for frequency converting said low-frequency index signal to reproduce said index signal, and means for synchronously detecting said modulated color signal by said reproduced index signal.

15. A color television camera as claimed in claim 4, wherein said means for processing said color signal includes frequency conversion means for frequency converting said modulated color signal into a signal having the same frequency as said low-frequency index signal; and means for synchronously detecting the signal obtained by said frequency conversion means by said low-frequency index signal.

16. A color television camera having a photoelectric conversion element and a stripe color filter, comprising:

means for providing an index section and a start index section;

means for generating a start/stop pulse from a signal obtained by scanning said start index section;

an oscillation means, the oscillation of which is started and stopped by said pulse;

a frequency conversion means for frequency converting an index signal, derived by scanning said index section, into a low-frequency signal by the output signal of said oscillation means;

means for storing the signal obtained by said frequency conversion means;

means for reading out the low-frequency index signal from said storing means in each horizontal scan; and means for processing is a circuit a modulated color signal which is space modulated by said stripe color filter and obtained at every one of said horizontal scan and said low frequency index signal to produce a color signal.

17. A color television camera as claimed in claim 16, wherein said index section is disposed at a beginning end portion of a vertical scan for said photoelectric conversion element, and said start index section is disposed at the beginning portion of the horizontal scan for said photoelectric conversion element.

18. A color television camera as claimed in claim 17, wherein said index section and/or said start index section comprise said photoelectric conversion element, said stripe color filter placed thereon, and means positioned thereabove for applying a biasing light of a color including at least one color of the light to be transmitted through said stripe color filter.

19. A color television camera, as claimed in claim 17, wherein the frequency of the start index signal derived by scanning said start index section is the same as the frequency of said modulated color signal.

20. A color television camera as claimed in claim 17, wherein the frequency of the index signal obtained by scanning said index section and the frequency of said modulation color signal are the same or the ratio thereof is constant.

21. A color television camera as claimed in claim 17, wherein said means for providing an index signal to said index section and said start index section includes means for applying a biasing light to at least one of said index and said start index, and means for providing repetitively a portion where said biasing light is to be applied and a portion where said biasing light is not to be applied.

22. A color television camera as claimed in claim 17, wherein at least one of said index section and said start index section includes means for applying an infrared ray to at least one of said index section and said start index section and means for selectively masking said infrared ray.

23. A color television camera as claimed in claim 17, wherein at least either one of said index section and said start index section is constructed by removing a photoconductor layer or a transparent electrode which form said photoelectric conversion elements.

24. A color television camera as claimed in claim 17, wherein at least one of said index section and said start index section is constructed by forming portions on said photoconductor layer.

25. A color television camera as claimed in claim 16, wherein said means for providing said index section and said start index section includes means for taking out the start index signal of a constant repetition frequency obtained by scanning said start index section, means for reshaping the start index signal into a square wave, and means for generating said start/stop pulse, starting at one of the leading edges or one of the trailing edges of said square wave.

26. A color television camera as claimed in claim 16, wherein said oscillation means comprises a voltage controlled oscillator (VCO), the oscillation frequency of which may be controlled by an external control voltage.

27. A color television camera as claimed in claim 26, further comprising an external control voltage generator including means for generating a signal to correct figure distortion in a beam scan.

28. A color television camera as claimed in claim 16, wherein said means for producing the color signal includes means for frequency converting said low-frequency index signal by the signal obtained by said oscillation means, in order to reproduce said index signal, and means for synchronously detecting said modulated color signal by said produced index signal.

29. A color television camera as claimed in claim 16, wherein said means for providing said color signal includes frequency conversion means for frequency converting said modulated color signal, into a signal having the same frequency as said low-frequency index signal, by the signal obtained from said oscillation means, and means for synchronously detecting the frequency converted signal by said low-frequency index signal.

* * * * *